United States Patent Office 2,699,489
Patented Jan. 11, 1955

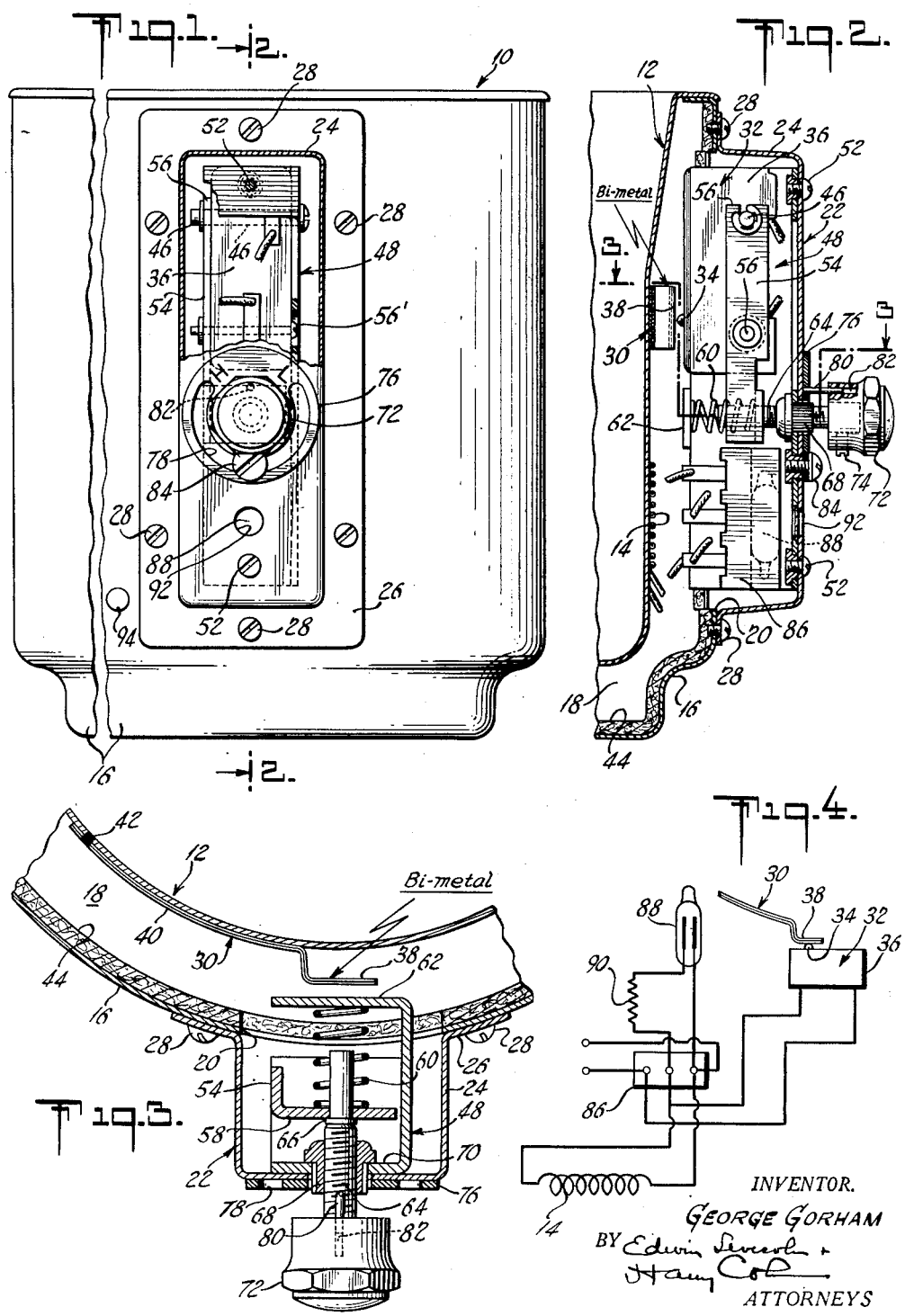

2,699,489

HEATING RECEPTACLE WITH TEMPERATURE-CONTROL MEANS THEREFOR

George Gorham, New York, N. Y., assignor, by mesne assignments, to Technicon International Ltd., New York, N. Y., a corporation of New York Application October 5, 1950, Serial No. 188,605

2 Claims. (Cl. 219—44)

The present invention relates to heating receptacles with temperature-control means therefor.

One object of the present invention is to provide a heating receptacle which is capable of maintaining the heated substance at a desired temperature without substantial variations from such desired temperature notwithstanding considerable variations in the temperature of the room or space in which the heating receptacle is in operation. For example, in the case of a paraffin bath used by pathologists for impregnating tissue with paraffin preliminary to the cutting of the sections by the microtome for microscopic examination, it is desirable that the paraffin be kept in a liquid condition at a particular temperature, and for this purpose paraffin baths as heretofore made have been provided with thermostatic controls for the electric heater. It has been found however that notwithstanding attempts to adjust the thermostatic control device to a close range of heater control, it was very difficult if not impossible to maintain the liquid paraffin at the desired temperature; on the contrary, with controls such as those heretofore used and with the construction of the heating receptacle heretofore provided, changes in room temperature were found to result in variations in the temperature of the liquid paraffin from the temperature at which the paraffin bath was set to operate. In accordance with the above stated object of the present invention these difficulties and objections are obviated.

Another object of the invention is the provision of improved temperature-control means for heating receptacles.

The above and other objects, features and advantages of this invention will be more fully understood from the following description considered in connection with the accompanying illustrative drawings.

In the drawings:

Fig. 1 is a front view of a heating receptacle, here shown as a paraffin bath, embodying the present invention, parts being cut away for illustrative purposes;

Fig. 2 is a sectional view on the line 2—2 of Fig. 1;

Fig. 3 is a fragmentary sectional view, on a larger scale, on the line 3—3 of Fig. 2; and Fig. 4 is a circuit diagram.

Referring now to the drawings in detail, the heating receptacle 10 here shown as a paraffin bath, comprises the open top metal container 12 which is provided with an electric heater 14 consisting of suitable electrically insulated resistance wire wound around the peripheral wall of said container at the lower part thereof, as illustrated in Fig. 2. Container 12 has a surrounding metal jacket 16 in spaced relation thereto providing an air space 18 completely around the container and at the bottom thereof. Jacket 16 has an opening 20 at which the temperature-control unit 22 is positioned. More particularly, the housing 24 of said unit 22 is provided with a flange 26 having openings for a plurality of screws 28 by which said housing is secured to jacket 16.

The temperature-control neans of the present invention comprises a thermal responsive member 30 which is operable in conjunction with a switch 32 of the control unit 22 to make and break the circuit of the electric heater 14. The thermal responsive member 30 is preferably in the form of a bi-metallic strip, as illustrated, and switch 32 is a normally-closed switch, preferably a normally-closed "micro-switch" having the usual push-pin actuator 34 which, when moved inwardly of the insulation switch casing 36, is operable to open the switch and thus interrupt the circuit of heater 14. As clearly illustrated in Figs. 2 and 3, the thermal responsive member 30 has a part 38 which is flexibly movable toward and away from actuator pin 34, axially of pin 34, for respectively moving said actuator inwardly of switch casing 36 to open the switch and for releasing said pin actuator so that the switch can close by its own spring operation, as in the usual micro-switch or other spring closed switch. As switches of this character are well known and do not in themselves form part of the present invention, further description of said switch 32 is unnecessary.

As clearly illustrated in Fig. 3 and pursuant to the present invention, the thermal responsive member 30 is positioned in direct heat exchange relation with container 12, and for this purpose the part 40 of said member 30 abuts the outer surface of the peripheral wall of container 12. More specicaly, one end of the thermal responsive member 12 is directly secured to said outer surface of the wall, being preferably spot welded thereto as indicated at 42. Part 40 and outer end part 38 are free to flex away from the peripheral wall of the container in response to the heat transmitted to said thermal responsive member from said peripheral wall of the container during the operation of the heating receptacle 10. As a result of the arrangement of the thermal responsive member so that it is subjected directly to the heat of the container wall instead of to the heat of the air in the air space 18, as was heretofore the case, said thermal responsive member is more sensitively responsive to the actual temperature of the paraffin bath or other substance in the heating receptacle than was the case with prior heating receptacles where the thermal responsive member was positioned in indirect heat exchange relation and was therefore affected to a considerable extent by the ambient temperature, for example the temperature of the room in which the heating receptacle is operated. In order further to minimize or eliminate the effect of the ambient temperature on the thermal responsive member, pursuant to the present invention, the heat insulation means for container 12 includes not only the jacket 16 and the air space 18 between the jacket and said container, but includes also the heat insulation, preferably sheet asbestos or glass wool, lining 44 which completely covers the inner surface of jacket 16 around container 12 except at the opening 20 where the control unit 22 is mounted. While insulation 44 is intended primarily to decrease the effect of the temperature of the ambient atmosphere on thermal responsive member 30, so that the latter is responsive substantially entirely to the temperature of the adjacent heat conductive part of the receptacle 12, said insulation also serves to decrease the escape of heat from jacket 16 and in this respect serves of course to conserve the heat provided by heater 14 and also serves to improve the uniformity of the heating of the paraffin or other substances in the receptacle 12 in the various portions thereof.

Further, in accordance with the present invention, provision is made for adjusting the temperature at which the thermal responsive member 30 is operable in conjunction with switch 32 to open and close the circuit of heater 14 in order to maintain the desired temperature of the substance in container 12. For this purpose, the switch 32 is mounted in housing 24 for movment toward and away from the thermal responsive member 30 so that more or less flexing of said member is required to open the switch and thus interrupt the circuit of heater 14. More particularly, as here shown, the insulation casing 36 of switch 32 is pivotally mounted on a pivot pin 46 which is carried by a frame 48 which is secured in housing 24 in any suitable way as by the screws 52. A strap 54 is fastened to switch casing 36, near the lower end of the latter by a screw bolt 56', and the upper end of said strap is forked as indicated at 56 to engage around the free end of pivot pin 46, so that movement of the lower end of said strap is operable to move switch 32 on pivot screw 46 pivotally toward, for lower operating temperature, and away from part 38 of thermal responsive member 30, for higher operating temperature. Strap 54 has an integral lug 58 which is engaged by a compression spring 60 at one end of the latter, the other end of said spring bearing against a lug 62 provided on frame 48, so that strap 54 is urged in a direction for moving switch 32 away from the thermal responsive member 30. The adjusting movement of switch member 32 in the opposite direction that is toward thermal responsive member 30 is accomplished by a screw threaded rotary stem or pin 64 which engages the headed pin 66. Stem 64 is in screw threaded engagement with an integral screw threaded sleeve 68 secured in the front part 70 of switch frame 48.

A knob 72 is releasably secured to stem 64 by a set screw 74 and operates in conjunction with a plate 76 provided with an arcuate slot 78 and with a pin 80 which is received within the opening 82 in said knob. A fastening screw 84 passes through slot 78 and member 76 and is threaded in the confronting wall of housing 24 for holding member 76 stationary in the adjusted position of knob 72. By reason of this construction a limited range of adjustment of stem 64 is provided when screw 84 is loosened so that member 76 can be turned by knob 72 by reason of the engagement of pin 80 in opening 82. The device just described is disclosed in my co-pending application Serial No. 152,724, filed March 29, 1950, and as explained in my said prior application is provided so that only a limited adjustment can be made by the user of the paraffin bath, the main adjustment having been made at the factory by adjustment of member 64 before knob 72 is secured thereto. It will be noted that the letters "H" and "L" on disk 76 indicate that when screw 84 is loosened and said disk is turned by knob 72 counter-clockwise, viewing Fig. 1, the operating temperature will be increased, the indication being derived from the movement of the letter "H" toward the index provided by the screw 84, and that when said disk is turned in the opposite direction the operating temperature of the heating receptacle will be decreased. After the disk 76 is set in the desired position it is releasably held in that position by screw 84. Ordinarily, the temperature-adjustment is made at the factory by adjusting pin 64 before knob 72 is operatively connected to disk 76 and in the factory adjustment, after pin 64 is adjusted, knob 72 is threaded on said pin and engaged with clutch-pin 80, without turning pin 64, after which set screw 74 is tightened. In this factory adjustment, screw 84 is disposed centrally of slot 78, as shown in Fig. 1. It will be understood however that as far as the other features of the present invention are concerned it is not essential that this particular device 72, 76 be utilized, and it will be understood therefore that as regards the other aspects of the present invention any suitable means may be utilized for adjusting the operating temperature of the heating receptacle.

An insulation terminal block 86 is carried by frame 48 and is provided with the terminals for the heater 14 for the pilot neon lamp 88 and its companion resistance 90, referred to in my said prior application, and for the electric supply cord. The supply cord (not shown) may be inserted through an opening 94 in jacket 16 and thereby connected to the terminals on block 16. The window opening for the pilot lamp in the front of housing 24 is indicated at 92.

Thus it is seen that the heating receptacle and the temperature-control means therefor are well adapted to accomplish the objects of the present invention. It will be understood, however, that the invention may be embodied otherwise than as herein specifically illustrated or described and that in the illustrated embodiment certain changes in the detail of construction and in the form and arrangement of parts may be made without departing from the underlying idea or principles of the present invention within the scope of the appended claims.

Having thus described my invention, what I claim and desire to secure by Letters Patent, is:

1. In a heating receptacle provided with an electric heater and control means for the latter, said control means comprising a thermal responsive member secured directly to a good heat-conductive part of said receptacle in heat exchange relation therewith; a circuit interrupter operable under the control of said thermal responsive member for closing and opening the circuit of said heater in accordance with the temperature of said part of the receptacle, and an insulation jacket for said receptacle provided with an opening, said circuit interrupter being pivotally mounted on said jacket at said opening and having an actuating member positioned within said jacket for engagement by said thermal responsive member for controlling said circuit, and a manual device operatively connected with said circuit interrupter for pivotally moving the latter relative to said thermal responsive member for adjusting the position of said actuating member towards and away from said thermal responsive member whereby to provide for the adjustment of the operating temperature of the receptacle.

2. In a heating receptacle provided with an electric heater and control means for the latter, said control means comprising a thermal responsive member welded to a good heat-conductive part of said receptacle in heat exchange relation therewith; a circuit interrupter operable under the control of said thermal responsive member for closing and opening the circuit of said heater in accordance with the temperature of said part of the receptacle, and an insulation jacket for said receptacle provided with an opening, said circuit interrupter being movably mounted at said opening and having an actuating member positioned within said jacket for engagement by said thermal responsive member for controlling said circuit, and a manual device mounted at said opening and operatively connected with said circuit interrupter for moving the latter relative to said thermal responsive member for adjusting the position of said actuating member towards and away from said thermal responsive member whereby to provide for the adjustment of the operating temperature of the receptacle, said manual device being accessible externally of said jacket for adjusting the position of said circuit interrupter.

References Cited in the file of this patent

UNITED STATES PATENTS

| Number | Name | Date |
|---|---|---|
| 682,472 | Lemmon | Sept. 10, 1901 |
| 1,662,556 | Woodson | Mar. 13, 1928 |
| 1,738,908 | Kuhn et al. | Dec. 10, 1929 |
| 2,168,158 | Hall | Aug. 1, 1939 |
| 2,170,681 | Finlayson | Aug. 22, 1939 |
| 2,194,117 | Graham | Mar. 19, 1940 |
| 2,223,780 | Carathers | Dec. 3, 1940 |
| 2,281,319 | Newell | Apr. 28, 1942 |
| 2,334,222 | Schoell | Nov. 16, 1943 |
| 2,337,251 | Knudsen | Dec. 21, 1943 |
| 2,356,784 | Graham | Apr. 29, 1944 |
| 2,353,151 | Elsenheimer | July 11, 1944 |
| 2,500,390 | Wales | Mar. 14, 1950 |
| 2,540,444 | Harland | Feb. 6, 1951 |
| 2,572,059 | Schlaich | Oct. 23, 1951 |